US010071486B2

(12) United States Patent
Flucke

(10) Patent No.: US 10,071,486 B2
(45) Date of Patent: Sep. 11, 2018

(54) ARTICULATED APPARATUS, MICROMANIPULATOR ARRANGEMENT HAVING SAID ARTICULATED APPARATUS AND METHOD FOR UTILIZING SAME

(71) Applicant: Eppendorf AG, Hamburg (DE)

(72) Inventor: Christian Flucke, Hamburg (DE)

( * ) Notice: Subject to any disclaimer, the term of this patent is extended or adjusted under 35 U.S.C. 154(b) by 576 days.

(21) Appl. No.: 14/428,610

(22) PCT Filed: Sep. 17, 2013

(86) PCT No.: PCT/EP2013/002791
§ 371 (c)(1),
(2) Date: Mar. 16, 2015

(87) PCT Pub. No.: WO2014/040753
PCT Pub. Date: Mar. 20, 2014

(65) Prior Publication Data
US 2015/0246448 A1    Sep. 3, 2015

Related U.S. Application Data

(60) Provisional application No. 61/701,745, filed on Sep. 17, 2012.

(30) Foreign Application Priority Data

Sep. 17, 2012   (EP) .................................... 12006527

(51) Int. Cl.
*F16H 21/00*   (2006.01)
*G06G 3/00*    (2006.01)
(Continued)

(52) U.S. Cl.
CPC ................. *B25J 17/00* (2013.01); *B25J 7/00* (2013.01); *G05G 5/04* (2013.01); *Y10T 74/20329* (2015.01)

(58) Field of Classification Search
CPC ................ B25J 17/00; B25J 7/00; G05G 5/04
See application file for complete search history.

(56) References Cited

U.S. PATENT DOCUMENTS 4,401,193 A * 8/1983 Arndt .................... B23Q 16/04
                                                           188/69
5,620,169 A    4/1997 Payne
(Continued)

FOREIGN PATENT DOCUMENTS

DE        4403687 A1    8/1995
JP        59-198163 A   9/1984
(Continued)

*Primary Examiner* — William J Cook
(74) *Attorney, Agent, or Firm* — Todd A. Lorenz

(57) ABSTRACT

The invention relates to an articulated apparatus for guiding a relative movement of components into a target position, which may be the operating position of a micromanipulator arrangement. The articulated apparatus has multiple parts, which are movable with respect to each other. Two stop devices are used which, in combination, imitate the "latching-in" of a conventional latching device, but offer a considerably greater level of precision. A combined stop position is settable as said target position in which the first stop position and the second stop position are both present. The invention uses two stop devices in order to imitate the leaving of the "latched" target position in two directions as in the case of latching. Such articulated apparatus may be typically used with a micromanipulator arrangement of a cytobiological or microbiological workstation.

12 Claims, 6 Drawing Sheets

(51) Int. Cl.
*H01Q 3/08* (2006.01)
*B25J 17/00* (2006.01)
*B25J 7/00* (2006.01)
*G05G 5/04* (2006.01)

(56) References Cited

U.S. PATENT DOCUMENTS

| | | | | |
|---|---|---|---|---|
| 5,771,749 A | * | 6/1998 | Yoneyama | B25J 7/00 |
| | | | | 359/392 |
| 6,159,199 A | | 12/2000 | Syska et al. | |
| 6,424,077 B1 | * | 7/2002 | Hata | B25J 7/00 |
| | | | | 310/323.17 |
| 7,395,607 B1 | * | 7/2008 | Broderick | B25J 7/00 |
| | | | | 33/503 |
| 7,695,682 B2 | | 4/2010 | Chojnacki et al. | |
| 8,920,060 B2 | | 12/2014 | Maekita | |
| 2002/0078525 A1 | | 6/2002 | Hua et al. | |

FOREIGN PATENT DOCUMENTS

| | | |
|---|---|---|
| JP | 08-281588 A | 10/1996 |
| JP | 2008229779 A | 10/2008 |
| JP | 2009-190156 A | 8/2009 |
| NL | 1029259 C2 | 12/2006 |
| WO | WO 2010/126726 A2 | 11/2010 |

\* cited by examiner

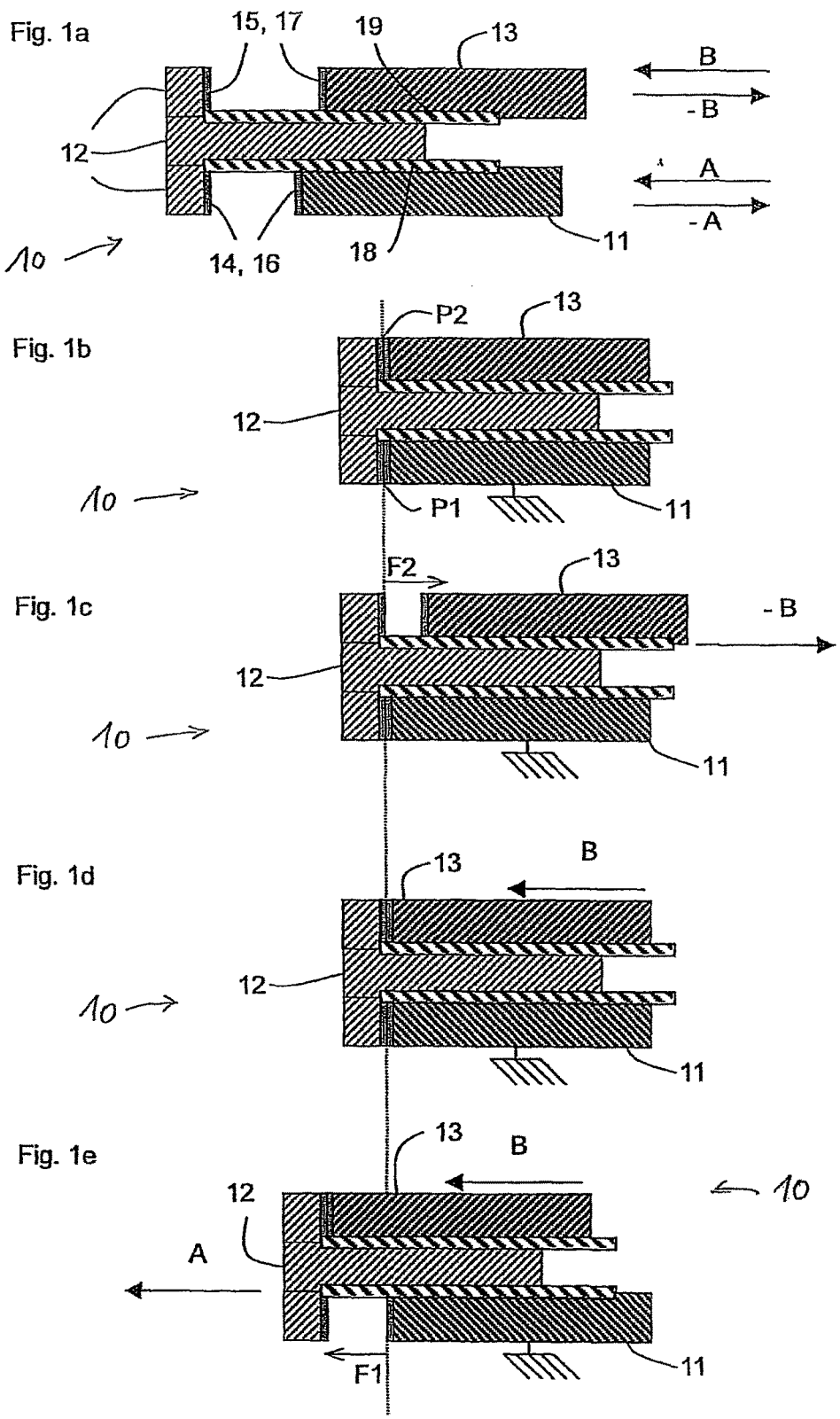

ARTICULATED APPARATUS, MICROMANIPULATOR ARRANGEMENT HAVING SAID ARTICULATED APPARATUS AND METHOD FOR UTILIZING SAME

The present invention relates to an articulated apparatus for guiding a relative movement of components into a target position, in particular for a micromanipulator arrangement, relates to a micromanipulator arrangement with said articulated apparatus and relates to a method for utilizing said articulated apparatus or said micromanipulator arrangement.

In the case of micromanipulator arrangements such an articulated apparatus is used for the purpose of coupling a first component, for example a tool holder with tool, to a second component, for example to the slide of a motorized movement device, so as to be movable, for example pivotable.

Micromanipulator arrangements require a high level of precision during the movement and positioning of their components. A micromanipulation can provide the manipulation of artificial objects, such as, for example, micro systems or nano systems and the components thereof. It can relate in particular to the manipulation of biological objects, such as, for example, living cells or micro organisms. Both areas of use require a high level of reliability and precision for the arrangement of the manipulation tools, for example capillary tubes, probes or electrodes, in a desired operating position in which an object, often microscopically small, is mechanically manipulated.

Articulated apparatuses of the present type are in particular beneficial for use with cytobiological and molecular biological workstations in which a user has to arrange micromanipulation tools, such as, for example, a capillary tube holder, quickly and precisely in a target position or has to remove them again quickly out of said target position. At such workstations, for example methods such as intracytoplasmatic spermatozoal injection (ICSI) and the transfer of embryonic stem cells (ES cells) in blastocystes are performed, where precise control of the position and movement of the components used in a micromanipulator arrangement in the smallest space is necessary.

In said context, it is particularly desirable to provide an efficiently and conveniently operable articulated apparatus by way of which the component to be moved, for example the tool of a micromanipulator arrangement, in particular a capillary tube or an actuator tip, can be brought precisely and quickly into a target position—or out of said position; in the target position, for example the capillary tube tip or another tool is arranged within the lens coverage of the microscope or of the camera. Associated with the typical method parts when carrying out cell manipulations is moving the tool, for example the capillary tube in a capillary tube holder, out of the target position in the short-term during the treatment of the cells in order to free it, for example, for other purposes (for example to change a growth medium for a biological cell, addition of substances, etc.) or in order to replace the tool. Afterwards the tool is to be moved back to the target position in as precise a manner as possible.

Micromanipulator arrangements frequently have a pivot joint for manual positioning such that by pivoting the manipulator arm in the direction of the cells a target position is reached which is already relatively close to the manipulation position in which the cell is contacted by the tool. An example of such a pivot joint is the hinged joint of the micromanipulator which came on the market in 2012 under the name of TransferMan® NK 2 (order number 5 188 000.012) from Eppendorf AG, Deutschland, Hamburg. The purpose of the hinged joint is to transfer the tool holder out of a target position in which the hinged joint is retracted, into a position suitable for a tool change in which the hinged joint is extended. The problem arises with all known articulated apparatuses that the target position of the articulated apparatus is not able to be reproduced again with the desired precision once the tool has been pivoted. In the case of known articulated apparatuses, the carrying out of additional adjusting steps is absolutely necessary in order to position the capillary tube tip together with the cells within lens coverage again. The time and money spent on labour is correspondingly high, in particular when pivoting the capillary tube tip out of the lens coverage of the microscope is an intermediate step which is frequently repeated.

It is particularly desirable for the target position to be met so precisely that there is no need to re-adjust the magnification step of the microscope. The target position should preferably be precise enough in order to move the tool tip at least into the lens coverage of the microscope. As a result, time-consuming adjustment steps are able to be avoided.

It is the object of the present invention to provide an articulated apparatus by way of which a target position is precisely settable in a repeated manner and to provide a conveniently operable micromanipulation arrangement with said articulated apparatus as well as a method for the utilization of the same.

The invention is achieved by the articulated apparatus according to Claim 1 and the micromanipulator arrangement according to Claim 11. Preferred developments are in particular objects of the sub-claims.

The invention relates to an articulated apparatus, in particular to a pivot joint apparatus for a micromanipulator arrangement, for guiding a relative movement of components into a target position, in particular for a micromanipulator arrangement, having at least one first part, one second part and one third part, wherein the first part and the second part are connected together so as to be movable for carrying out a first relative movement, wherein the second part and the third part are connected together so as to be movable for carrying out a second relative movement, having at least one first stop device and one second stop device, wherein by way of the first stop device the first relative movement is blocked in a first stop position, in which the first and second part impact against one another in a first direction, wherein by way of the second stop device the second relative movement is blocked in a second stop position in which the second and third part impact against one another in a second direction, having at least one first fixing device and one second fixing device, wherein the first and second part are held by way of the first fixing device in the first stop position in opposition to a release force which is directed in a negative first direction until said release force exceeds a first fixing force, wherein the second and third part are held by way of the second fixing device in the second stop position in opposition to a release force which is directed in a negative second direction until said release force exceeds a second fixing force, and wherein a combined stop position is settable as said target position in which the first stop position and the second stop position are both present.

The target position is characterized in that the articulated apparatus is arranged such that the first stop position and the second stop position are both present at the same time. The target position is set in particular by the user of the articulated apparatus bringing about the impacting of the first and second part and the impacting of the third and second part in a manual manner. The target position is predefined in particular in a structural manner and is in particular not modifiable, as a result of which it is able to be approached by the user again and again with a high level of precision when the first and/or second parts are not arranged in the first and/or second stop position. Said target position can be utilized in particular as an operating position where an object to be manipulated is processed, i.e. manipulated, by means of the micromanipulation tool which is mounted on the articulated apparatus.

The artificial or biological object to be manipulated, in particular a cell/a micro organism or cells/micro organisms, is usually situated in a culture vessel or on a small cover glass, within the lens coverage of a microscope or a camera. The articulated apparatus according to the invention with the attached micromanipulation tool is preferably mounted on the microscope, or on the microscope with camera, such that a micromanipulation arrangement is produced. In the case of said micromanipulation arrangement, the range of the micromanipulation tool designed for micromanipulation is also situated (just as the object to be manipulated) within the lens coverage of the microscope or of the camera, i.e. in the target position which is technically predefined by the two stops the micromanipulation tool is directed to the operating position.

The articulated apparatus according to the invention enables relative movements of the micromanipulation tool which is attached on said articulated apparatus such that the attached micromanipulation tool is able to assume different relative positions. Thus, it is possible for the object to be manipulated to be situated opposite a micromanipulation tool which is mounted on the articulated apparatus in a relative position which is suitable for a tool change. This is advantageous for the user in order, for example, to change the micromanipulation tool which is fastened on the articulated apparatus, as in said relative position his hands carrying out the change are not situated in the vicinity of the object to be manipulated and said object cannot be contacted in an unwanted manner and consequently cannot be displaced; in a further advantageous relative position the micromanipulation tool is pivoted out of the surrounding area of the object such that the object is safely accessible to the user for usual manual processing steps (e.g. medium change, adjustment of the object, addition of further cells (in particular egg cell or sperm) and/or depositing of cover glasses, etc.). Safely in this context means without the risk of contacting a micromanipulation tool (e.g. a pointed capillary tube of glass) in an unwanted manner. If there is unwanted contact of the micromanipulation tool, the user can become contaminated with a chemical or biological substance or can also injure himself painfully on the usually used sharp-edged glass capillary tubes. The articulated apparatus according to the invention reduces this risk.

Target positions are often defined by conventional latching devices in the case of known pivot joint apparatuses. During pivoting, spring-mounted latching pins slide vertically into a rounded indentation by way of their end in a, for example, horizontal pivot plane and latch there in a substantially form-fitting manner. Within the framework of the present invention it has been ascertained that in the case of conventional latching devices, the components to be locked in the pivot plane still have minimum horizontal mobility in the latched-in target position, which is caused by the locking arrangement being too highly flexible, i.e. the conventionally locked components are moved even under slight loads. Said minimum mobility is not optimum for certain applications, e.g. in the case of micromanipulators which are used in particular with cytobiological and microbiological workstations. The minimum mobility in the vicinity of the joint is translated in dependence on the length of the pivot arm into a greater positional error which does not meet the demands for precision.

In the case of the articulated apparatus according to the invention, a target position is not defined by a conventional latching arrangement, but by the arrangement according to Claim 1, which corresponds in operation to latching in the target position. Two stop devices are used which, in combination, imitate the "latching-in" of a conventional latching device, but offer a considerably greater level of precision. A movement in the direction of movement can be blocked precisely by means of a stop in order to define a target position precisely. The invention uses two stop devices in order to imitate the leaving of the "latched" target position in two directions as in the case of latching.

In a first preferred embodiment of the invention the articulated apparatus is a pivot joint apparatus, and the first and second relative movements are rotations about a first and second rotational axis A or B, which can overlap in parallel. A rotation about the common rotational axis A can then be effected in the positive rotational direction $\omega$, which is also designated as the positive direction of rotation. In a corresponding manner a rotation about the common rotational axis A can also be effected in the negative rotational direction $-\omega$), which is also designated as the negative direction of rotation. However, it is also possible and preferred for the first and/or second relative movements to extend along a path of movement which deviates from a circular path. In a second preferred embodiment of the invention, the articulated apparatus is a prismatic joint apparatus where the first and second relative movements are translations along a first and second linear direction A or B, which can overlap in parallel.

The first relative movement is preferably a rotation about a first rotational axis A and said first direction corresponds to a rotation in the positive direction of rotation about the rotational axis A, and, at the same time, or independently thereof, the second relative movement is preferably a rotation about a second axis of rotation B and said second direction corresponds to a rotation in the positive direction of rotation about the rotational axis B.

The first part is preferably a component which has a connecting portion by way of which the first component is connectable to the second part so as to be movable, in particular rotatable. In addition, the first part preferably has a fastening portion by means of which an external component is fastenable to the first part. The third part is preferably a component which has a connecting portion by way of which the third component is connectable to the second part so as to be movable, in particular rotatable. In addition, the third part preferably has a fastening portion by means of which an external component is fastenable to the third part. The external component can be a component of a micromanipulator arrangement, in particular a pivot arm, a motor module, in particular the motorized and/or manually movable slide of a motorized or manual movement device, a support component of a support arrangement, or can be a part of a further articulated apparatus, in particular of an articulated apparatus according to the invention. The connecting portion can be the receiving portion for receiving an axis element which defines a rotational axis about which the first and the second part and/or the third and the second part are rotatable in each case in relation to one another. In addition, the connecting portion can also have such an axis element.

An axis element is preferably fixedly connected to the second part. The second part preferably has two axis elements. It is also possible and preferred for the first part and/or the third part to have an axis element, the second part then preferably having at least one, in particular two receiving portion(s) for receiving an axis element. An axis element is realized for the purpose of defining a rotational axis about which the first part and the second part and/or the third part and the second part are able to rotate in relation to one another. An axis element can have or be a cylindrical component. The axis element can be, in particular, a substantially cylindrical pin element. The axis element on the second part is preferably a double-axis element. Said double-axis element has two axis elements which are preferably arranged in parallel, in particular on a common rotational axis A. The two axis elements are connected by means of a connecting portion. The connection can be force-fitting and/or form-fitting and/or positively-bonding. The two axis elements can also be integrally connected.

The articulated apparatus preferably has at least one first guide device and one second guide device, wherein the first relative movement is guided by the first guide device and the second relative movement is guided by the second guide device, wherein, in particular, the first relative movement extends along a first path of movement into a positive or negative first direction, and wherein, in particular, the second relative movement extends along a second path of movement into a positive or negative second direction, wherein, in particular, the first and second paths of movement are parallel.

The first guide device preferably has at least one guide portion which is preferably connected to the second part, and/or a guide portion which is connected to the first part. The second guide device preferably has at least one guide portion which is preferably connected to the second part, and/or a guide portion which is connected to the third part. A guide portion can be a separate component or can be realized integrally with the second part and/or the first part and/or the third part. A guide portion can be an axis element which defines a rotational axis.

The first and/or second guide device, and in particular the axis element, are preferably realized for the purpose of enabling the relative rotation of the first and second part, and/or of the third and second part about a pivot angle $\gamma$. The pivot angle $\gamma$ in the case of the relative rotation of the first and second part is measured from the first stop position, in which $\gamma=0$, and in the case of the relative rotation of the third and second part is measured from the second stop position, in which $\gamma=0$. The relative rotation about the angle $\gamma$ of the first and second part is preferably possible within a pivot range where $0\leq\gamma\leq\gamma1$, wherein $\gamma1$ is preferably taken from the group of preferred angular ranges in each case of {60° to 90°; 90° to 120°; 120° to 180°; 180° to 270°}, preferably in a positive pivot direction $\omega$. The relative rotation about the angle $\gamma$ of the third and second part is preferably possible within a pivot range where $0\leq\gamma\leq\gamma2$, wherein $\gamma2$ is preferably taken from the group of preferred angular ranges in each case of {−60° to −90°; −90° to −120°; −120° to −180°; −180° to −270°}, that is preferably in a negative pivot direction −$\omega$. The pivot directions of the first and second part and of the third and second part are therefore opposed. It is also possible for $\gamma1$ to have negative values and $\gamma2$ to have positive values.

The possible pivot range of the first and second part and the possible pivot range of the third and second part can be the same, that is to say $\gamma1$ and $\gamma2$ can be the same amount, or can be different. The target position is defined as a result of the angle $\gamma$ of the first part and of the second part and the angle $\gamma$ of the third and second part both being zero. As a result of values of the pivot angle not being equal to zero, relative positions of the first and second part or of the third and second part are defined, in which, for example, in the case of a micromanipulator arrangement the tool change is able to be carried out—designated as the position for tool change—or an object or sample can be safely handled—designated as the position for object handling. Such a relative position is preferably held by means of a holding device, in particular a friction device which will also be described.

The maximum pivot angle, e.g. $\gamma1$, and/or the minimum pivot angle, e.g. $\gamma2$, can be defined by a third stop position and/or a fourth stop position which can be defined by a third stop device of the first and second part or a fourth stop device of the third and second part. When using the articulated apparatus according to the invention in a micromanipulator arrangement on a microscope, the minimum and/or maximum pivot angle can be limited by physical boundaries.

A guide device, in particular the first and/or second guide device, preferably has in each case a pivot bearing device, preferably a sliding bearing device or preferably a roller bearing device, in order to mount two parts side by side so as to be movable, in particular the first and the second part or the second and the third part. The roller bearing device preferably has an angled roller bearing device with a first and a second roller bearing which are tensioned in relation to one another by means of a spring device. Said angled roller bearing device achieves a high level of precision for guiding as the roller elements, in particular balls, of the roller bearing are mounted in a substantially play-free manner. This has proved advantageous in particular when using the articulated apparatus with a micromanipulator arrangement where a high level of precision is important. The spring device is preferably a cup spring or has such a cup spring. A cup spring, in the case of the articulated apparatus according to the invention, provides the desired tensile forces for the relative fixing of the first and second roller bearing, as a result of which a level of precision is achieved for guiding. In addition, the cup spring allows the articulated apparatus to be designed compactly, which is advantageous in particular in the case of micromanipulator arrangements with restricted installation space.

The first fixing device and/or the second fixing device preferably have in each case at least one magnetic element and in particular a magnetic element which is complementary thereto for realizing the magnetic attraction force, in particular by means of ferromagnetism. One fixing device can have several magnetic elements which generate the desired fixing force, in particular 2, 3, 4, 5, 6 magnetic elements or another number. Such a development makes it possible to set the stop position precisely and to release it again with precisely defined fixing forces.

The magnetic element can be an integral component of the first and/or of the second and/or of the third part. A magnetic element is preferably a permanent magnet or has such a permanent magnet. The magnet preferably has a cover element in order to protect it from mechanical damage when it is loaded by the impacts in said first and/or second stop position. The permanent magnet is preferably produced from a samarium-cobalt alloy or has said materials. Said materials have proved to be particularly resistant to corrosion in the laboratory in moist surroundings or in surroundings loaded with chemicals. However, it is also possible to use other permanent magnets.

The magnetic element can also be an electromagnet or can have such an electromagnet.

If the articulated apparatus is a pivot joint apparatus or has rotatable elements, the first fixing force can be a first fixing torque and the second fixing force can be a second fixing torque.

The first fixing device and/or the second fixing device can additionally have a connecting device for the force-fitting and/or form-fitting connection between the first part and the second part in the first stop position, or a connecting device for the force-fitting and/or form-fitting connection between the second part and the third part in the second stop position in order to fix the parts in a releasable manner in the stop position. The connecting device can have, for example, a spring-mounted latching connection.

The articulated apparatus preferably has a first holding device which is realized for the purpose of opposing the first relative movement with a resistance, at least one first breakaway force being necessary to overcome said resistance and the articulated apparatus preferably has a second holding device which is realized for the purpose of opposing the first relative movement with a resistance, at least one second breakaway force being necessary to overcome said resistance. Using such a holding device, it is possible to set different relative positions in a temporary manner between two parts, in particular the first and second part or the second and third part such that in particular an inadvertent adjustment due to small acting forces and vibrations does not result in a change in the set relative position. As a result, working with the articulated apparatus is more comfortable and safer.

The first holding device preferably has a first friction device which brings about a first sliding friction during the first relative movement and in non-moved relative positions of the first and second part brings about a first static friction, at least said first breakaway force being necessary to overcome said sliding and static friction and the second holding device preferably has a second friction device which brings about a second sliding friction during the second relative movement and in non-moved relative positions of the first and second part brings about a second static friction, at least said second breakaway force being necessary to overcome said sliding and static friction. A friction device can have an auxiliary element, which brings about the friction, or it can manage without an auxiliary element, for example by correspondingly producing two friction parts with its guide device having a press-fit/transition fit or a very small clearance fit which then forms in particular the friction device.

If the articulated apparatus is a pivot joint apparatus or has rotatable elements, the first breakaway force can be a first breakaway torque and the second breakaway force can be a second breakaway torque.

The first and the second fixing force are in each case greater than said first and/or second breakaway force. As a result, the first and the second part can be released from a relative position which is held by the first holding device without the second stop position which is held by the second fixing device being released. In addition, as a result the second and the third part can be released from the relative position which is held by the second holding device without the first stop position which is held by the first fixing device being released. The first and second fixing force can be the same size or can deviate from one another.

The first and/or the second friction device can preferably have an auxiliary element in order to arrange or to generate the friction. The auxiliary element can be or have a spring element which brings about a normal force between the faces of the parts which are moved toward one another, between which the friction occurs, in order to increase the friction by means of an elevated normal force. The auxiliary element can be elastically deformable and can be arranged between the parts which are moved in relation to one another, in particular between the first and second part and/or the second and third part. The auxiliary element can have an elastically deformable material, e.g. rubber or another elastomer. The auxiliary element preferably has a lubricating film produced from a fluid lubricant, in particular a silicone grease, in order to reduce the abrasion of the auxiliary element caused by the friction and to adjust the frictional force.

The first friction device preferably has as an auxiliary element an elastically deformable ring which is arranged concentrically with respect to a first rotational axis A and which is clamped between the first part and the second part for bringing about the first sliding friction and first static friction, and the second friction device preferably has as an auxiliary element an elastically deformable ring which is arranged concentrically with respect to a second rotational axis B and which is clamped between the second part and the third part for bringing about the second sliding friction and second static friction. Particularly uniform friction can be brought about during rotation by means of a ring. The ring is preferably arranged concentrically around a cylindrical axis element of the guide device, it being possible for the axis element to be a component part of the second part. The ring is preferably arranged in such a manner around the axis element that it is under tensile stress.

The friction device can have a lubricant, e.g. a mineral oil or silicone oil, the desired friction being achieved and the abrasion reduced or prevented by the use thereof. The lubricant can be provided between the auxiliary element, in particular the ring, and an axis element, it being possible to arrange the axis element on the first, second and/or third part. The lubricant, however, can also be provided between the ring and the first and/or third part.

A circular recess, in which the ring can be arranged such that it is clamped under pressure between the first part and the second part and provides the friction in this manner, is preferably provided between the first part and the second part. A circular recess, in which the ring can be arranged such that it is clamped under pressure between the second part and the third part and provides the friction in this manner, is preferably provided between the second part and the third part. The circular recess preferably has an inside face which is realized for sliding. The advantage of this is that the abrasion of the ring brought about by friction is reduced and the ring has to be exchanged less frequently.

The first and the third part preferably have in each case a fastening device for the fastening of a further component, in particular by means of a groove/tongue joint. To this end, the fastening device can provide a groove which is mounted on and/or is integrally realized on the first and/or third part, or can provide a spring which is mounted on and/or is integrally realized on the first and/or third part. The groove can be in particular T-shaped. The spring can have, in particular, a T-shaped sliding block element which can be mounted on the first and/or third part in particular so as to be movable.

The articulated apparatus preferably has at least one fourth part, wherein the third and the fourth part are connected together so as to be movable for carrying out a third relative movement, in particular by means of a third guide device, having a third stop device, by way of which the third relative movement is blocked in a third stop position in which the third and fourth part impact against one another in a third direction, and having a third fixing device by way of which the third and fourth part are held in the third stop position in opposition to a release force which is directed into a negative third direction until said release force exceeds a third fixing force and wherein a second combined stop position is settable as a second target position in which the second stop position and the third stop position are both present. More than one target position can be defined on the articulated apparatus in this manner.

The first and second relative movement is preferably a rotation which can be measured in degrees. The precision q of the setting of the combined stop position where q preferably is $<=(+-) 5*10^-1$ degrees, where preferably $q<=(+-)10^-2$ degrees, where preferably $q<=(+-) 5*10^-3$ degree and where preferably $q<=(+-)10^-4$ degrees. The term "precision" in this context means that the relative positioning of the first part and the third part in the combined stop position, namely the "target position" Z, is settable repeatedly within the range of Z+−q. The same preferably applies to the precision of the first stop position P1+−q and/or the second stop position P2+−q.

The "precision" of the setting of the first stop position within the framework of the present invention is determinable by means of the following measuring method: the following two experiments are carried out N=10 times: in the first experiment, the first part and the second part are deflected out of the stop position in a positive pivot direction ω by the maximum pivot angle γ. From said relative position, the first and the second part are moved back into the stop position. The measured angular deviation ζ1 of the first stop position is noted. Ten first values ζ1 are determined in this way. In the second experiment the first part and the second part are deflected out of the stop position in a negative pivot direction −ω by the maximum—or minimum—(amount-wise) pivot angle −γ. From said relative position, the first and the second part are moved back into the stop position. The measured angular deviation ζ2 of the first stop position is noted. Ten second values ζ2 are determined in this way. The precision q1 corresponds to the largest value (amount-wise) of the twenty values ζ1, ζ2 determined in this manner. The precision q2 of the second stop position is determined in an analogous manner. As precision of the combined stop position, that is the target position, the sum of the two values of the precision q1 can be used for the first stop position and q2 for the second stop position.

The first part and the third part are preferably structurally identical components. They can be arranged on the second part in a left-handed manner or right-handed manner. As a result, the production of the articulated apparatus is simplified, on the one hand for the producer, on the other hand for the user who is able to assemble the articulated apparatus in the desired manner. It is also possible and preferred for the first and the second components to be mirror-symmetrically formed components.

The articulated apparatus preferably has at least one first fastening means, in particular a fastening element for a force-fitting and/or form-fitting connection, e.g. a screw connection, e.g. a releasable screw, or a locking element, in order to fasten the first and the second part to one another so as to be releasable.

The invention also relates to a micromanipulator arrangement which has the articulated apparatus according to the invention. The micromanipulator arrangement preferably has a first component, in particular a first arm element which is said first part of the articulated apparatus or is connected to the first part of the articulated apparatus. The micromanipulator arrangement preferably has a second component, in particular a second arm element which is said third part of the articulated apparatus or is connected to the third part of the articulated apparatus. The first and the second component can in each case be the slide of a motor device or can be connected to the same. Such a slide is movable in a motorized manner by means of the motorized movement device of the micromanipulator arrangement, in particular a linear motor of the movement device.

In the case of the micromanipulator arrangement according to the invention, an articulated apparatus according to the invention is used for the purpose of coupling a first component, for example a tool holder with tool, to a second component, for example to the slide of a motorized movement device, so as to be movable, for example pivotable. A micromanipulation having said micromanipulator arrangement can provide the manipulation of artificial objects, such as, for example, micro systems or nano systems and the components thereof. It can relate in particular to the manipulation of biological objects, such as, for example, living cells or micro organisms. Both areas of use require a high level of reliability and precision when arranging the manipulation tools, e.g. capillary tubes, probes or electrodes, in a desired operating position in which an object, frequently microscopically small, is mechanically manipulated. The articulated apparatus according to the invention is particularly suitable for this.

A manipulation tool, also called a tool, can be a capillary tube or an actuator tip, or a cutting or grooving tool which is suitable for micromanipulation, or a micro electrode. The tool can also designate the tool holder which carries for example the capillary tube or the cutting or grooving tool. The tool holder can also be, in particular, an electrically actuatable actuator which, for example, can be driven in a piezo-electric manner. Associated with the typical method parts when carrying out cell manipulations is moving the tool, for example the capillary tube in a capillary tube holder, out of the target position in the short-term during the treatment of the cells in order to free it, for example, for other purposes (for example to change a growth medium for a biological cell, addition of substances, etc.) or in order to replace the tool. Afterwards the tool is to be moved back to the target position in as precise a manner as possible. The articulated apparatus according to the invention of the micromanipulation arrangement according to the invention serves in a particularly suitable manner for this purpose.

The first and/or the second component can be in each case in particular: the pivot arm of a micromanipulator, or the tool holder with or without a tool, the slide or the motor-driven element of a motorized movement device, a component of a holding device, of a support, a component of a microscope.

In addition, the use of the articulated apparatus according to the invention at a biological, medical, cytobiological or microbiological workstation, in particular for the manipulation of living cells, in particular in a microbiological, cytobiological or medical laboratory, is deemed as an invention.

Associated with the invention is also a method for utilizing the articulated apparatus according to the invention, in particular in the case of a method for the micromanipulation of an object, in particular an artificial or biological object, in particular a living cell or a micro organism. To utilize the articulated apparatus according to the invention, the method preferably has at least one of the following steps:

(a) fasten the articulated apparatus on an external component eB1, in particular by connecting the first part or the third part to the external component eB1, in particular an external component eB1 of a micromanipulator arrangement according to the invention, the external component eB1 being, in particular, a support device for said articulated apparatus, and/or being a movable element, in particular a slide, of a motorized support device;

(b) fasten an external component eB2 on the articulated apparatus, in particular by connecting the external component eB2 to the first part or the third part of the articulated apparatus, it being possible to connect the external component eB2 indirectly—e.g. by means of at least one connecting element—or directly to the articulated apparatus, it being possible for the external component eB2 to be, in particular, a tool holder for a micromanipulation tool which can be, in particular, a capillary tube or a micro dissection tool;

(c) position the object at a distance to an articulated apparatus according to the invention, in particular to a micromanipulation apparatus according to the invention;

(d) set the target position of said articulated apparatus as an operating position in which, in particular, a micromanipulation tool, which is connected to the articulated apparatus, in particular a capillary tube or a micro dissection tool, is at the desired operating distance to the object;

(e) proceeding from the first stop position, in particular proceeding from the target position: carry out a first relative movement, in particular a rotation in a direction of rotation ω, between the first part and the second part of said articulated apparatus, until the first part and the second part are arranged in a first relative position;

(f) proceeding from the second stop position, in particular proceeding from the target position: carry out a second relative movement, in particular a rotation in an opposite direction of rotation −ω, between the third part and the second part of said articulated apparatus, until the third part and the second part are arranged in a second relative position;

(g) proceeding from the first relative position described in step (e) or the second relative position described in step (f): carry out manual treatment of the first part and/or of the third part, in particular remove and/or release a manipulation tool which is connected to the first or third part (tool change); said relative position is designated as the position for tool change.

(h) proceeding from the first relative position described in step (e) or the second relative position described in step (f): carry out a treatment of the object to be manipulated, in particular remove or add medium (culture medium, growth medium or IVF medium) buffer, a solution or oil, remove the object and/or add a further object (e.g. further cells, e.g. egg cell is the first object, then add sperm as the second object or vice versa) (object handling); said relative position is designated as the position for object handling.

(i) proceeding from the first relative position described in step (e) or the second relative position described in step (f): reposition the articulated apparatus into the target position (operating position) by pivoting it back manually out of the first and/or or second relative position.

Further preferred developments of the articulated apparatus according to the invention are produced from the following description of the exemplary embodiments in conjunction with the figures and the description thereof. Identical components of the exemplary embodiments are characterized substantially by identical references if nothing to the contrary is described or nothing to the contrary is produced from the context; in which:

FIG. 1a shows the articulated apparatus according to the invention according to a preferred exemplary embodiment of the invention.

FIG. 1b to FIG. 1e show a possible movement sequence in the case of the articulated apparatus from FIG. 1a along the directions of movement A or B.

FIG. 1b shows the articulated apparatus from FIG. 1a in the combined stop position which forms the target position in which the first stop position of the first and second part and the second stop position of the second and third part are present.

FIG. 1c shows the articulated apparatus from FIG. 1a in the first stop position of the first and second part and in a relative position of the second and third part.

FIG. 1d shows the articulated apparatus from FIG. 1a once again in the combined stop position which forms the target position.

FIG. 1e shows the articulated apparatus from FIG. 1a in the second stop position of the second and third part and in a relative position of the first and second part.

FIG. 2b is a perspective rear view of the pivot joint apparatus from FIG. 2a.

FIG. 2c is a perspective exploded representation of the pivot joint apparatus from FIG. 2a.

Figure 2A:
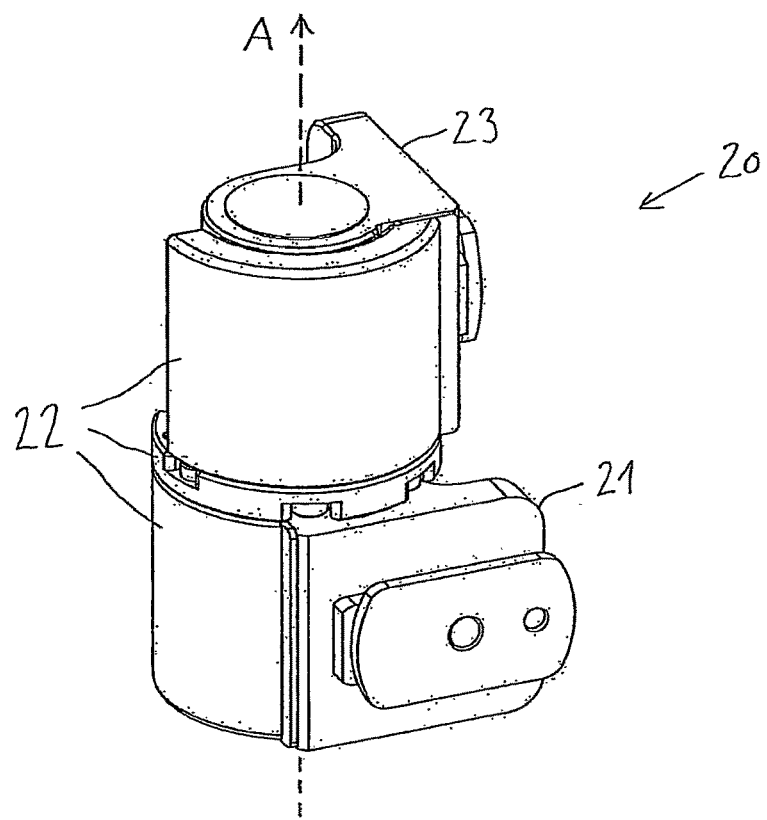
FIG. 2a is a perspective front view of a pivot joint apparatus according to the invention according to a preferred embodiment.
Figure 3A:
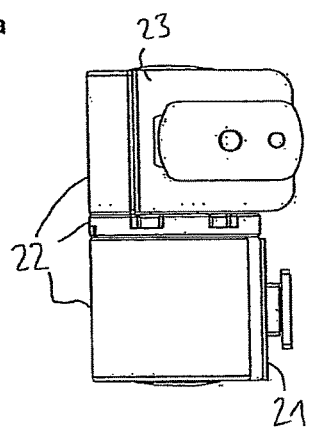

FIGS. 3a and b show a perspective side view (FIG. 3a) and a bottom view (FIG. 3b) of the pivot joint apparatus of FIG. 2a in the target position, analogous to the target position of the articulated apparatus in FIG. 1a, 1d.

Figure 3B:
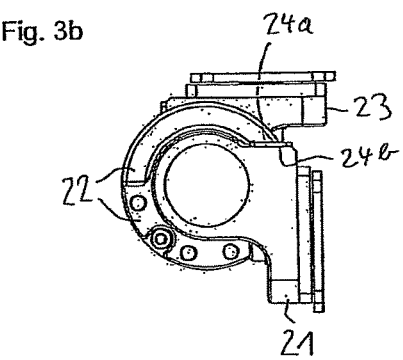
Figure 3C:
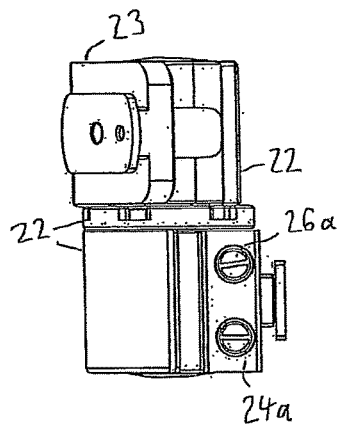

FIGS. 3c and d show the pivot joint apparatus of FIG. 2a in a position analogous to the position of the articulated apparatus in FIG. 1e.

Figure 3D:
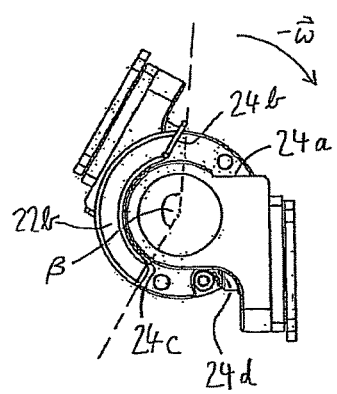
Figure 3E:
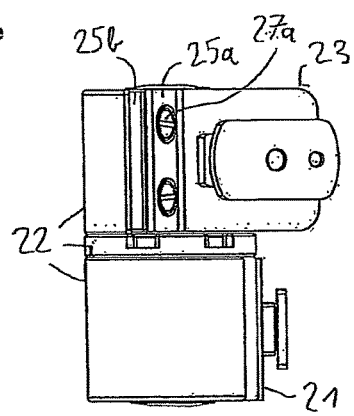
Figure 3F:
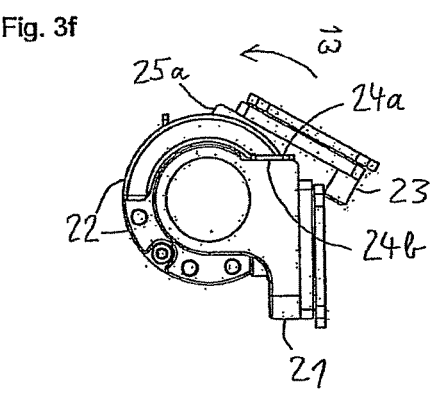

FIGS. 3e and f show the articulated apparatus of FIG. 2a in a position analogous to the position of the articulated apparatus in FIG. 1c.

Figure 4:
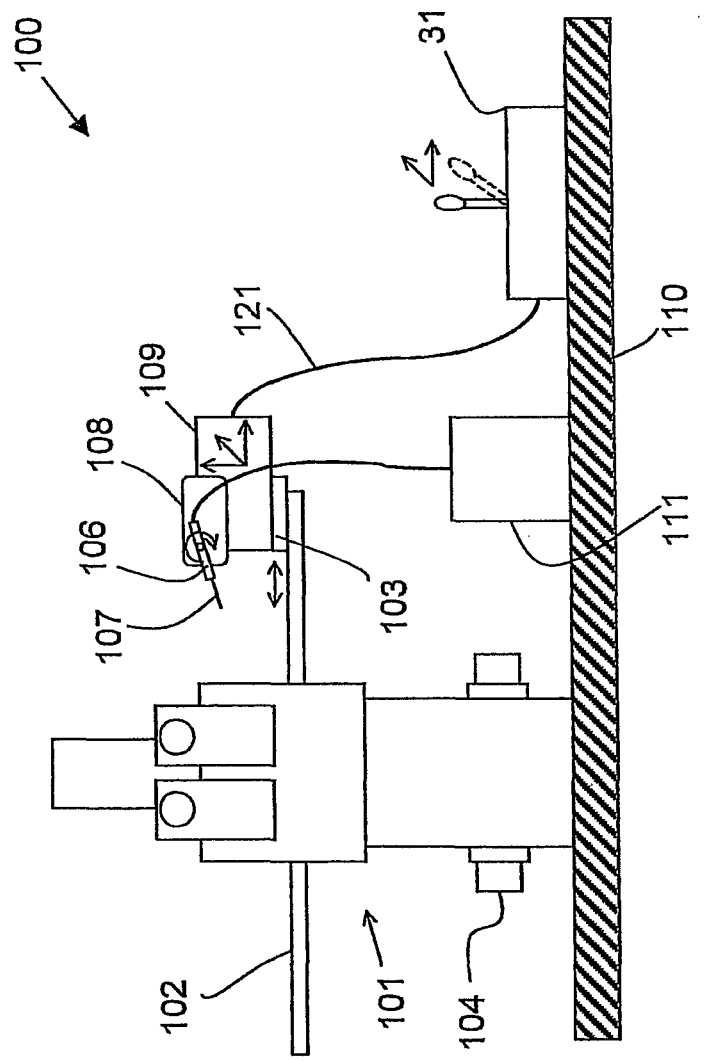

FIG. 4 shows a workstation, at which the connecting apparatus according to the invention is used in a preferred manner.

Figure 5:
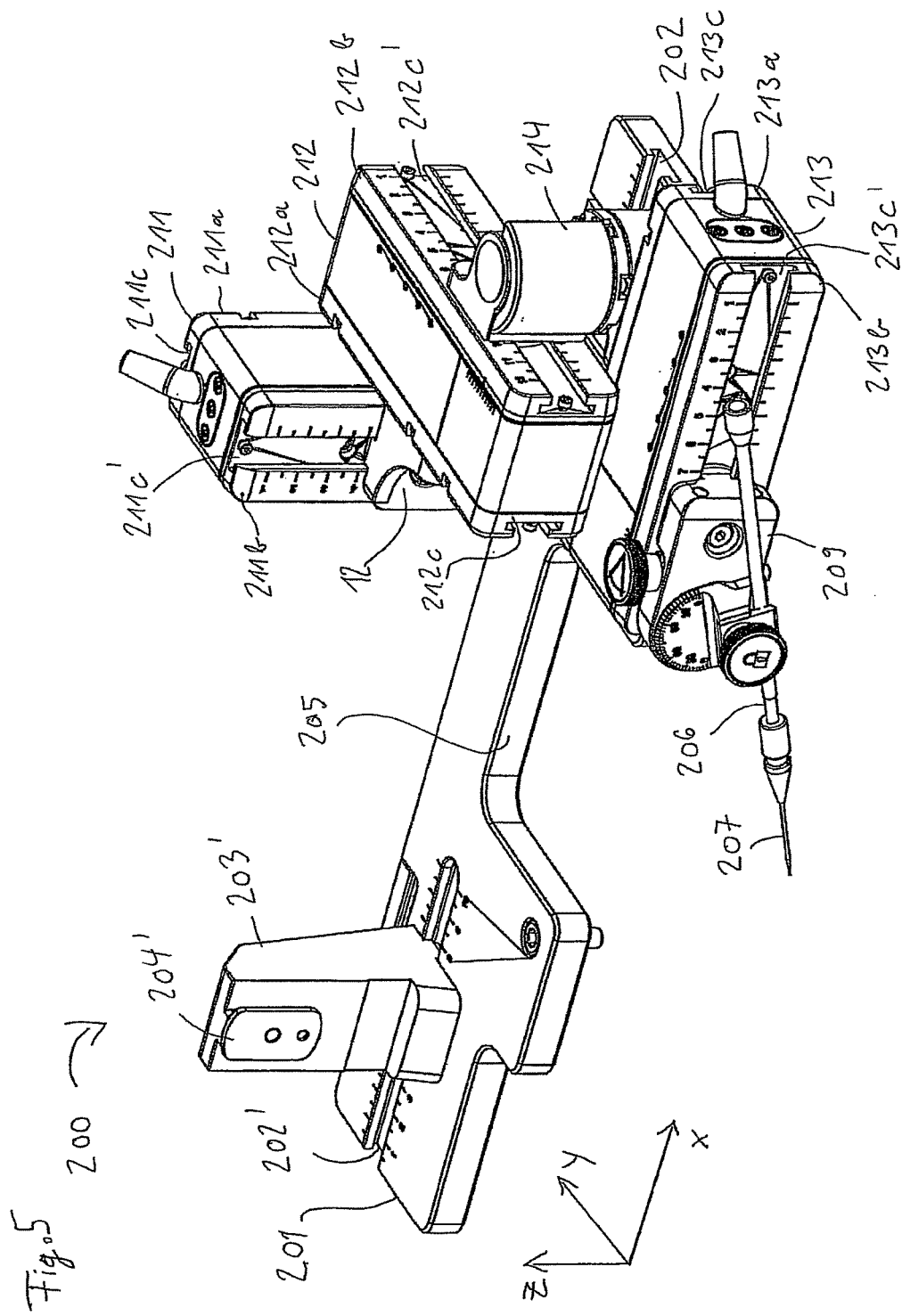

FIG. 5 shows an exemplary embodiment of a micromanipulator arrangement according to the invention which has an articulated apparatus according to the invention, in particular that of the exemplary embodiment of FIG. 1a, 1b, 2a to 2c and 3a to 3f.

FIG. 1a shows the articulated apparatus 10 according to the invention according to a preferred exemplary embodiment of the invention. It can be used with a micromanipulator arrangement for guiding a relative movement of components into a target position. The articulated apparatus 10 is constructed with a first part 11, a second part 12 and a third part 13, the first part 11 and the second part 12 being connected together so as to be movable for carrying out a first relative movement A, the second part 12 and the third part 13 being connected together so as to be movable for carrying out a second relative movement B, having at least one first stop device 14 and a second stop device 15, by way of the first stop device 14 the first relative movement A being blocked in a first stop position P1 in which the first 11 and second part 12 impact against one another in a first direction, by way of the second stop device 15 the second relative movement B being blocked in a second stop position P2, in which the second 12 and third part 13 impact against one another in a second direction B, having at least one first fixing device 16 and one second fixing device 17, the first 11 and second part 12 being held by way of the first fixing device 16 in the first stop position P1 in opposition to a release force which is directed in a negative first direction until said release force exceeds a first fixing force F1, the second 12 and third part 13 being held by way of the second fixing device 17 in the second stop position P2 in opposition to a release force which is directed in a negative second direction until said release force exceeds a second fixing force F2, and a combined stop position being settable as said target position in which the first stop position and the second stop position are both present.

The first stop device 4 also forms in this case the first fixing device 16, e.g. by means of a permanent magnet, and the second stop device 15 also forms in this case the first fixing device 17. A first guide device 18 serves here for guiding the first relative movement A and a second guide device 19 serves here for guiding the second relative movement B. A designates here a first direction of movement of the second part with reference to the first part; B designates here a second direction of movement of the third part with reference to the second part. The directions in opposition thereto bear the negative prefix. The directions of movement A and B are to be understood schematically, but, corresponding to the representation in the figures, can be a linear movement parallel to the same linear direction of movement A=B. In the case of a rotational movement, the directions A and B would correspond in each case to a positive direction of rotation or in the case of a negative prefix to a negative direction of rotation.

FIG. 1*b* to FIG. 1*e* show a possible movement sequence for the articulated apparatus from FIG. 1*a* along the directions of movement A or B. The first part 11 of the articulated apparatus is deemed to be a fixed reference point, with reference to which the movement A of the second part 12 is effected.

FIG. 1*b* shows the articulated apparatus 10 in the combined stop position which forms the target position in which the first stop position P1 of the first and second part and the second stop position P2 of the second and third part are present.

FIG. 1*c* shows the articulated apparatus from FIG. 1*a* in the first stop position of the first and second part. By overcoming a second fixing force F2 the second 12 and third part 13 have been released from one another and transferred into a relative position.

FIG. 1*d* shows the articulated apparatus from FIG. 1*a* once again in the combined stop position which forms the target position.

FIG. 1*e* shows the articulated apparatus from FIG. 1*a* in the second stop position of the second 12 and third part 13 and in a relative position of the first and second part, which has been achieved by means of movement A of the second part 12 in relation to the first part 11 by overcoming the first fixing force F1. The manually effected force has been transmitted by means of force transmission via the third part 13 to the second part 12 and from the second part 12 to the first part 11.

Figure 2B:
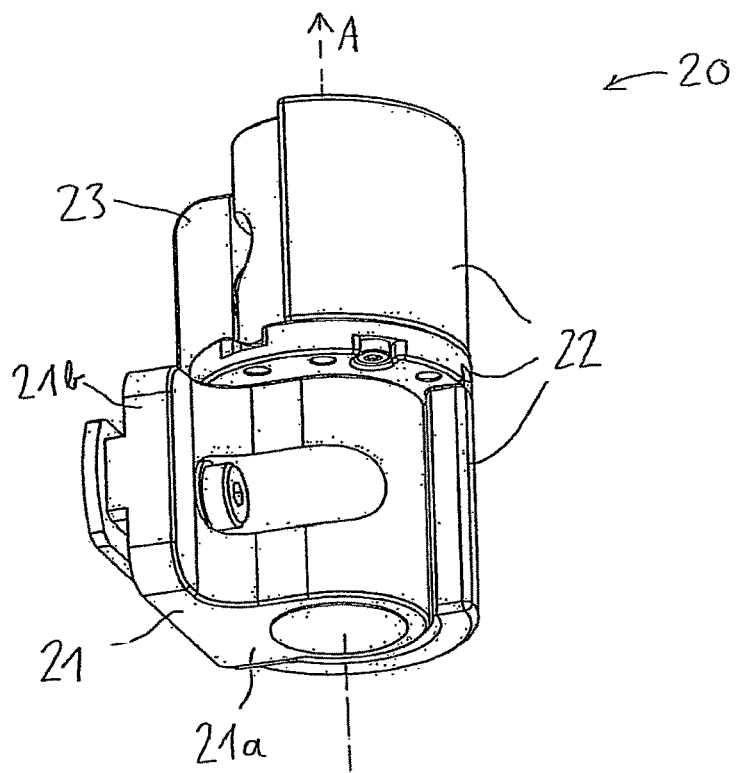

FIG. 2*a* is a perspective front view of a pivot joint apparatus 20 according to the invention according to a preferred embodiment, FIG. 2*b* shows the rear view thereof. The pivot joint apparatus has the first part 21, the second part 22 and the third part 23 which are able to be rotated in each case about the rotational axis A until they impact against one another in stop regions.

Figure 2C:
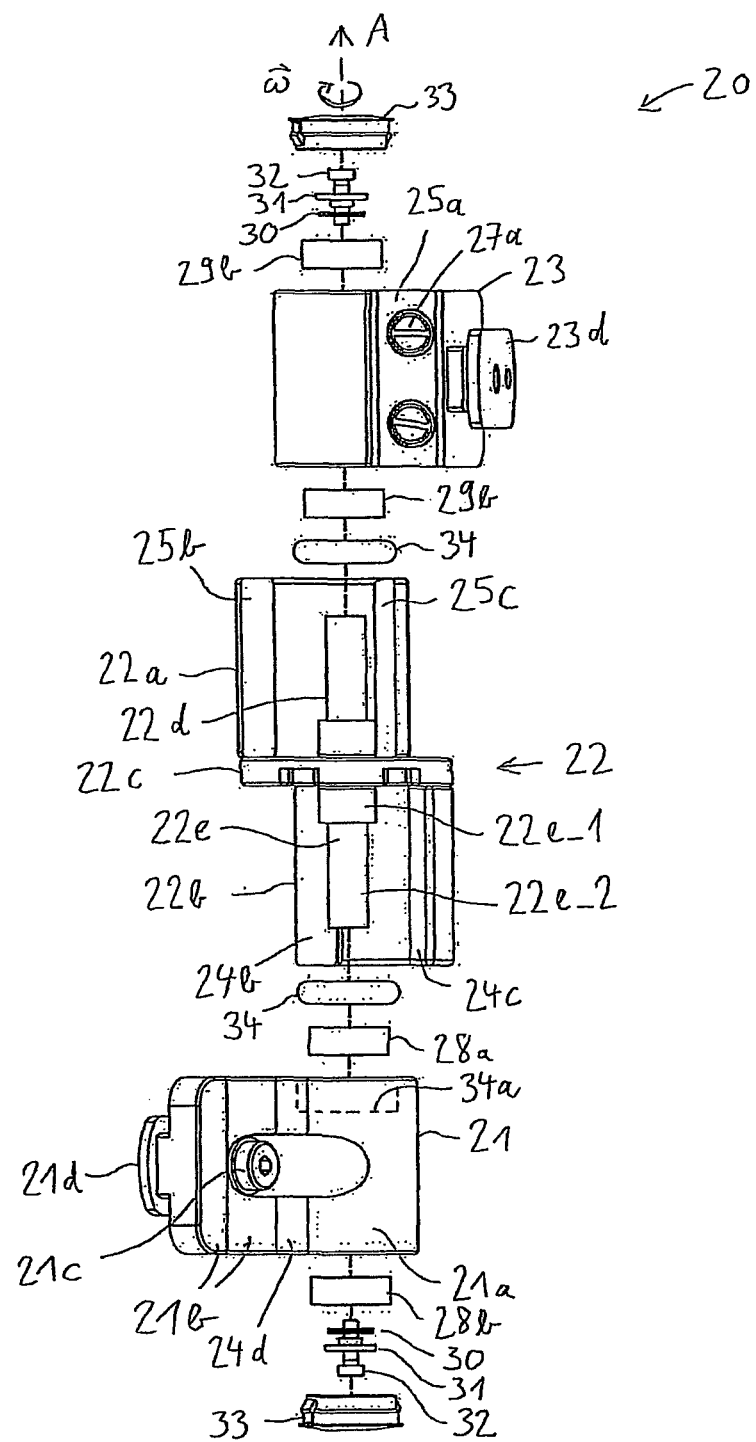

FIG. 2*c* shows the design of the pivot joint apparatus 20 in an exploded view. The first part 21 and the third part 23 are constructed identically, which simplifies the production of the rotary joint and the assembly thereof. The following explanations regarding the design of the first part 21 are consequently applicable in an analogous manner to the third part 23, and vice versa.

During assembly the first part 21 is placed onto the axis element 22*e* of the second part 22 and the third part is placed onto the axis element 22*d* of the second part 22. The second part preferably has a disc-shaped mounting plate 22*c* which is produced in this case from steel. Said plate is fixedly connected to the two axis elements 22*d* and 22*e*. The two axis elements 22*d* and 22*e* lie parallel to one another and concentrically with respect to the common rotational axis A. On the one side of said mounting plate 22*c* the stop element 22*b* is fixedly mounted by means of screws, on the other side of the base plate 22*c* the stop element 22*a* is fixedly mounted by means of screws. The stop element 22*b* has the stop region 24*b* and the stop element 22*a* has the stop region 25*b*, the function of the stop regions being yet to be described. The stop elements are preferably produced from aluminium. It is also possible and preferred for the second part to be an integrally produced component, in particular for the stop elements to be integrally connected together, that is in particular without a separate connecting mounting plate or a comparable connecting element. In general, the stop regions can also be realized in an integral manner or can be provided as separate stop portions which are connected to the second part.

The stop element 22*a* is constructed in a mirror-symmetrical manner with respect to the stop element 22*b*. A stop element is preferably formed such that it corresponds to the wall portion of a hollow cylinder element which is arranged in particular concentrically with respect to the rotational axis A. Said wall portion, as in the present case, can run around the rotational axis A in part, preferably within an angular range β from 90° to 270°, preferably within an angular range β of between 125° and 190°, preferably within an angular range β from 140° to 180°. In the case of the pivot joint apparatus 20, a stop element 22*a*, 22*b* extends concentrically about the rotational axis at an angle β of approximately 155°, which is shown in FIG. 3*d*. On ends of the stop element 22*b* which are opposite in the circumferential direction about the rotational axis A, said stop element has the stop regions 24*b* and 24*c*, or the stop element 22*a* has the stop regions 25*b* and 25*c* (FIG. 3*d*).

The first part 21 has a hollow-cylindrical-like receiving portion 21*a* which has a cylindrical recess for receiving the axis element 22*e* of the second part 22. Connected integrally with the receiving portion 21*a* is the fastening portion 21*b*, on which in the present case a spring element 21*d* is mounted by means of a screw 21*c* for a tongue-groove joint. By means of the tongue-groove joint, components are able to be mounted on the pivot joint apparatus 20 in a comfortable manner. In particular, as is also realized, a first component, e.g. a mounting for a micromanipulator arm, can be connected by means of the tongue-groove joint of the third part 23, or of the first part 21, to the articulated apparatus 20 and a tool holder of the micromanipulator arrangement can be connected to the articulated apparatus 20 by means of the tongue-groove joint of the first part 21, or of the third part 23.

The pivot joint apparatus 20 has a first stop device 24 by way of which the first relative rotational movement is blocked in a first stop position in which the first 21 and second part 22 impact against one another in a first direction of rotation.

The pivot joint apparatus 20 also has a second stop device 25, by way of which the second relative rotational movement is blocked in a second stop position in which the third 23 and second part 22 impact against one another in a second direction of rotation.

The first stop device 24 has two stop regions 24a (not visible in FIG. 2c) and 24b, the stop region 24a being a stop face of the first part 21 which is realized parallel to the rotational axis A, and the stop region 24b being a stop face of the second part 22 which is also realized parallel to the rotational axis A, the two stop faces 24a and 24b contacting one another in a flat manner and preferably being realized in a plane manner.

The second stop device 25 is constructed in an analogous manner: it also has two stop regions 25a and 25b, the stop region 25a being a stop face of the third part 23 which is realized parallel to the rotational axis A, and the stop region 25b being a stop face of the second part 22 which is also realized parallel to the rotational axis A, the two stop faces 25a and 25b contacting one another in a flat manner and preferably being realized in a plane manner.

When the first part 21 is arranged so as to be rotatable on the second part 22, the stop region 24a is moved toward the stop region 24b and impacts there in the first stop position. In this case, it must be assumed that the second part is held fixedly—which is not the case when the pivot joint apparatus is used correctly—and the direction of rotation ω is that where the first part would be moved in a clockwise manner in a top view of the pivot joint apparatus 20—or would be moved in an anti-clockwise manner in the bottom view in FIGS. 3b, 3d and 3f. The same applies: when the third part 23 is arranged so as to be rotatable on the second part 22, the stop region 25a is moved toward the stop region 25b and impacts there in the second stop position. The first stop position and the second stop position are set with great precision. As a result, the combined stop position can always be set again and again in a precise manner, which is very desirable in the case of a micromanipulator device, in particular in the case of a cytobiological and/or microbiological workstation.

As shown in FIG. 3d, in the present case further stop regions 24c, 24d, 25c, 25d are present, by way of which the first, second and third part in each case impact against one another in the case of a relative rotational movement in the negative, that is to say opposite, direction of rotation −ω.

The pivot joint apparatus has a first fixing device 26 and a second fixing device 27. The first 21 and second parts 22 are held by way of the first fixing device 26 in the first stop position in opposition to a release torque which is directed in a negative direction of rotation −ω until said release torque exceeds a first fixing torque. The second 22 and third parts 23 are held by way of the second fixing device 27 in the second stop position in opposition to a release torque which is directed in a negative direction of rotation −ω until said release torque exceeds a second fixing torque.

The first fixing device 26 has the two permanent magnets 26a which are admitted into the first stop face 24a of the first part 21. The first fixing device 26 also has magnetic regions 26b of the stop face 24b which develop an attracting interaction with the permanent magnets 26a. The stop face 24b, in the present case, is realized so as to be fully magnetically attracting to the permanent magnets 26a. The second fixing device 27 has the two permanent magnets 27a which are admitted into the first stop face 25a of the third part 23. The second fixing device 27 also has magnetic regions 27b of the stop face 25b which develop an attracting interaction with the permanent magnets 27a. The stop face 25b, in the present case, is realized so as to be fully magnetically attracting to the permanent magnets 27a. The permanent magnets 26a, 27a have a cobalt-samarium-alloy.

During assembly, the first part 21 is placed onto the axis element 22e of the second part 22 and the third part is placed onto the axis element 22d of the second part 22. The rotation of the first part 21 on the second part 22 is guided by a first guide device 28 which has associated therewith the axis element 22e of the second part 22, the cylindrical recess of the first part 21 for receiving the axis element 22e and the roller bearings 28a and 28b. The rotation of the third part 23 on the second part 22 is guided by a second guide device 29 which has associated therewith the axis element 22d of the second part 22, the cylindrical recess of the third part 23 for receiving the axis element 22d and the roller bearings 29a and 29b.

The roller bearings 28a, 28b and 29a, 29b are also received in the receiving portion of the first 21 or third part 23. The receiving portions of the first part 21 and of the third part 23 are covered toward the outside in each case by a cover flap 33.

The roller bearings 28a and 28b—and in an analogous manner the roller bearings 29a and 29b—form an angled roller bearing device having a first 28a and a second roller bearing 28b, which are tensioned in relation to one another by means of a cup spring 30, a spring mandrel element 31 for holding the cup spring and a screw 32. The spring mandrel element 31 provides a stop side, on which the cup spring 30 is supported. Said angled roller bearing device achieves a high level of precision of the guiding as the roller elements, in particular balls, of the roller bearing are mounted in a substantially play-free manner. This has proved advantageous in particular when using the articulated apparatus with a micromanipulator apparatus, where a high level of precision is important.

The pivot joint apparatus has a first holding device 41 which is realized for the purpose of opposing the relative first rotational movement of the first 21 and second part 22 with a resistance, at least one first breakaway torque being necessary to overcome said resistance. The pivot joint apparatus has a second holding device 42 which is realized for the purpose of opposing the relative second rotational movement of the third 23 and second part 22 with a resistance, at least one second breakaway torque being necessary to overcome said resistance.

The first 41 and second holding devices 42 are realized in each case as a friction device. The first friction device 41 brings about a first sliding friction during the first rotational movement and in non-moved relative positions of the first 21 and second part 22 brings about a first static friction, at least said first breakaway torque being necessary to overcome said sliding and static friction. The second friction device 42 brings about a second sliding friction during the second rotational movement and in non-moved relative positions of the third 21 and second part 22 brings about a second static friction, at least said second breakaway torque being necessary to overcome said sliding and static friction.

The first and the second fixing torques are in each case greater than said first and/or second breakaway torque. Through said determining of the fixing and breakaway torque, the fixing of the first 21 and second part is maintained when, by overcoming the second breakaway force, the stop face 25a of the third part 23 is moved in the positive rotational direction ω toward the stop face 25b of the second part 22, e.g. proceeding from the position in FIGS. 3e and 3f. In addition, through said determining of the fixing and breakaway torque, the fixing of the third 23 and second part 22 is maintained when by rotating the third part 23 and the second part 22 in relation to the fixed first part 21 by overcoming the first breakaway force the stop face 24a of the second part 22 is moved in the negative rotational direction −ω toward the stop face 24a of the first part 23, e.g. proceeding from the position in FIGS. 3c and 3d.

The first friction device has as an auxiliary element an elastically deformable ring 34 which is arranged concentrically with respect to the rotational axis A and which is clamped between the first part 21 and the second part 22 for bringing about the first sliding friction and first static friction. The stress is generated by the ring 34 being clamped between the outer wall of the cylinder portion 22e_1 of the axis element 22e and the inner walls of the cylindrical recess 34a—indicated by the dot-dash line in FIG. 2c, as a result of which a compression force is therefore generated substantially in the direction radially with respect to the rotational axis A. In an analogous manner, a further elastic ring 34 is clamped between the third part 23 and the second part 22 and is thus a component part of the second friction device.

The ring 34 is preferably under compressive stress on all sides substantially radially with respect to the axis element by it preferably being clamped between an axis element 22e, 22d and first part 21 or the third part 23, or between an axis element of the first or third part and the second part. The ring is preferably secured on the outside diameter in a recess of the first part or of the third part, i.e. it is in particular unable to rotate there. There is certainly also a friction-fit there, the holding force, however, is greater than the adhesion force between the inner surface of the ring and the axis element 22e, 22d, as the joint between the outer surface of the ring and the recess 34a is preferably not lubricated and the surface pressure (and consequently the normal force) is smaller as the outside diameter of the ring is greater than the inside diameter.

FIGS. 3a, b, c and d show the pivot joint apparatus of FIG. 2a in positions which are analogous to the positions of the articulated apparatus in FIGS. 1b, 1c and 1e. FIGS. 3a, 3c and 3e are perspective side views of the rotary apparatus 20, where the first part 21 is fixed. FIGS. 3a, 3c and 3e are correspondingly the perspective bottom views of the pivot joint apparatus 20 where the first part 21 is fixed.

FIGS. 3a and 3b show the combined stop position in which the first part 21 impacts against the second part 22 and both are fixed side by side and in which the third part 23 impacts against the second part 22 and both are fixed side by side. The first part 21 is now fixed, as in the situation in FIGS. 1b to 1e. The third part 23 can then be rotated by the user in a selective manner in the negative direction of rotation −ω or in the positive direction of rotation ω. The combined stop position, as shown in FIG. 3a, 3b, is repeatedly reproducible again and again in a precise manner using the pivot joint apparatus according to the invention.

If the user rotates the third part 23 out of the combined stop position of FIG. 3a, 3b in the rotational direction ω, the third part 23 then presses against the stop face 25b of the second part 22 by means of the stop face 25a of the third part 23 until a first release torque is generated, and the magnetic fixing between the stop face 24a of the first part 21 and the magnetic stop face 24b of the second part is released. The user, by overcoming the sliding friction between the first part 21 and the second part 22, presses further in the direction of rotation and ends in an arbitrary relative position according to FIG. 3c, 3d, in which the first part 21 and the third part 23 are held in relation to one another by means of static friction such that said relative position is not released by light forces, smaller than the static friction. As a result, secure handling of the micromanipulator arrangement is possible using said articulated apparatus.

If the user rotates the third part 23 out of the combined stop position of FIG. 3a, 3b in opposition to the direction of rotation ω, that is to say in the direction −ω, the first part 21 then presses against the stop face 24b of the second part 22 by means of the stop face 24a of the first part 21 until a second release torque is generated, and the magnetic fixing between the stop face 25a of the third part 23 and the magnetic stop face 25b of the second part is released. The user, by overcoming the sliding friction between the third part 23 and the second part 22, presses further in the negative direction of rotation and ends in an arbitrary relative position according to FIG. 3e, 3f, in which the first part 21 and the third part 23 are held in relation to one another by means of static friction.

FIG. 4 shows a cytobiological workstation 100 which has various instruments and the holding apparatus 1. The workstation includes a microscope 101, the piezoelectric micro actuator 106 which is realized as a capillary tube holder 106 with its electric control 111, a micro positioning device (10, 31) which has an operating apparatus 31 with a joystick and the movement device 10 which is connected thereto by means of a cable device 121. The movement device 31 is part of a micromanipulator arrangement. The capillary tube thereof 106 is mounted so as to be movable and is movable with a high level of precision by means of the drive of the movement device. The articulated apparatus, e.g. as described in the exemplary embodiment of FIG. 1a to 1e, is used in order to arrange two components of the micromanipulator arrangement in a comfortable and precise manner manually in relation to one another and to fix them in the desired target position.

The drive of the movement device 10 has three stepper motors (not shown), by means of which the holding apparatus 1 is movable along the three axes x', y', z' of a Cartesian system of coordinates, controlled by the output signal of the operating apparatus 31 in dependence on the positional change x, y, z brought about by the user. The operating apparatus controls the movement in the directions of the x-y plane by means of joystick excursion. It is also possible to control it by means of a rotary wheel of the joystick lever button in particular in the z-direction. The workstation can have further instruments, e.g. a micro pump apparatus for pumping liquids in the capillary tube, a second joystick device etc. The instruments are, as a rule, arranged on a laboratory table 110. An optional pedal control apparatus can be arranged under the table.

The user of said workstation, during a typical application, e.g. carrying out ICSI, places for example a Petri dish with a cell on the work surface 102 of the—in this case inverted-microscope 101, then moves the movement device 20, which is manually movable by means of a slide 103, into the vicinity of the Petri dish, then moves the capillary tube holder 106 with a capillary tube 107 manually relatively quickly in the direction of the Petri dish, in particular until it dips into the growth medium contained in the Petri dish. In this case, it is highly advantageous for the component parts of the micromanipulator arrangement to be able to be arranged or aligned and fixed side by side by means of the connecting apparatus according to the invention in a comfortable manner, in particular by using just one hand.

By means of the pivot joint apparatus according to the invention, the capillary tube tip of the capillary tube 107 can be moved out of the target position and out of the lens coverage of the microscope simply and quickly and at the same time extremely precisely, and can be moved back again in a precise manner into the target position and the lens coverage without further adjustment operations to the microscope or by means of the micro positioning device being needed for this purpose. By means of the articulated apparatus, the operating sequences become efficient and at the same time are ergonomical.

Manual positioning, that is adjusting the positions of the components of the manipulator arm with respect to one another in order to achieve the suitable operating position (or configuration) on the microscope, can be carried out on the microscope with sufficient precision and with suitable resolution without the help of the micro positioning device. Only approximately 1-2 mm is adjusted without the sample vessel with sample being arranged in the sample vessel receiving means of the microscope by the optical axis in the lens coverage of the microscope being targeted with the capillary tube. As a result of the precise axial mobility of the sliding block element in the groove, the translatory movement of the components to be displaced toward one another is always effected in a precise manner along the groove longitudinal axis.

Once the capillary tube holder has been moved manually, the micro positioning device is precisely positioned in a motor-controlled manner by means of the joystick and the movement device. The user adjusts the optical focus between the capillary tube tip and the cell using one hand by means of the focussing wheel 104 in order to observe the distance between the capillary tube tip and the target point on the cell. Precision control within the range of, in this case, between 50 nm and 15 µm is effected in the vicinity of the cell by slightly deflecting the joystick. In the case of this application it is advantageous that the operation of the workstation and its instruments, in particular the articulated apparatus 1', is effected intuitively and comfortably with one hand.

FIG. 5 shows a micromanipulator arrangement 200 which has an articulated apparatus 214 according to the invention which can be used at a workstation, as shown in FIG. 4.

The micromanipulator arrangement 200 has the holding arm 201. It has the groove portion 202 and the groove portion 202'. A holding means 203' is developed as an angle connector and has two sliding blocks 204'. A second holding means 203 which is similar to the first holding means 203' is not visible as it is screened by the movement device 211, 212, 213 which holds it. The holding arm 201 is fastened on the support of a microscope. Arrangements, for example two movement devices, can be mounted on both sides of the central recess 205 of the holding arm 201 on the two holding means 203', 203.

A movement device serves for micro positioning a tool, in particular the capillary tube 207 with the capillary tube holder 206 and holding apparatus 209. The movement device has three main components, the motor unit 211 for moving in the z-direction, the motor unit 212 for moving in the y-direction and the motor unit 213 for moving in the x-direction. A motor unit 211, 212, 213 has in each case a first plate portion 211a, 212a, 213a with a groove portion 211c, 212c, 213c, and a driven second plate portion 211b, 212b, 213b with a groove portion 211c', 212c', 213c' which is arranged so as to be linearly movable in each case in relation to the plate portion 211a, 212a, 213a. An angle connector 12 is arranged in each case as connecting element between the first plate portion 211a, 212a and the second plate portion 211b, 212b.

Between the first plate portion 213a and the second plate portion 212b there is arranged a pivotable connecting element 214, an articulated apparatus according to the invention which allows for manual pivoting of the motor unit 213 with components fastened thereon about the z-axis, and enables precise arranging of the capillary tubes 207 in the target position. The articulated apparatus 214 can be the above-described pivot joint apparatus 20. In this case, the third part 23 of the pivot joint apparatus 20 is connected by means of the groove-tongue joint by way of spring element 23d and groove 212c' of the plate portion 212c to the plate portion 212c and the first part 21 is connected by means of the groove-tongue joint by way of spring element 21d and groove 213c of the plate portion 213a to the plate portion 213a. As a result of the pivot joint apparatus 20, the module group 213, 209, 206, 207 is connected to the plate portion 212c so as to be pivotable. An articulated apparatus according to the invention which enables the pivot arms to be arranged, aligned and fixed in a comfortable, precise manner, in particular by means of the method according to the invention for utilizing the articulated apparatus, is utilized in this way with the micromanipulator arrangement in FIG. 5.

The invention claimed is:

1. An articulated apparatus (10; 20) for guiding a relative movement of components into a target position, in particular into an operating position in the case of a micromanipulator arrangement, having at least one first part (11; 21), one second part (12; 22) and one third part (13; 23), wherein the first part (11; 21) and the second part (12; 22) are connected together so as to be movable for carrying out a first relative movement, wherein the second part (12; 22) and the third part (13; 23) are connected together so as to be movable for carrying out a second relative movement, having at least one first stop device (14; 24) and one second stop device (15; 25), wherein by way of the first stop device (14; 24) the first relative movement is blocked in a first stop position, in which the first (11; 21) and second part (12; 22) impact against one another in a first direction, wherein by way of the second stop device (15; 25) the second relative movement is blocked in a second stop position, in which the second (12; 22) and third part (13; 23) impact against one another in a second direction, having at least one first fixing device (16; 26) which brings about a first fixing force and one second fixing device (17; 27) which brings about a second fixing force, wherein the first (11; 21) and second part (12; 22) are held by way of the first fixing device (16; 26) in the first stop position in opposition to a release force which is directed in a negative first direction until said release force exceeds the first fixing force, wherein the second (12; 22) and third part (13; 23) are held by way of the second fixing device (17; 27) in the second stop position in opposition to a release force which is directed in a negative second direction until said release force exceeds the second fixing force, and wherein a combined stop position is settable as said target position in which the first stop position and the second stop position are both present, the articulated apparatus having at least one first guide device (18; 28) and one second guide device (19; 29), wherein the first relative movement is guided by the first guide device and the second relative movement is guided by the second guide device, wherein the first relative movement extends along a first path of movement into a positive or negative first direction, and wherein the second relative movement extends along a second path of movement into a positive or negative second direction, wherein in particular the first and second paths of movement are parallel.

2. The articulated apparatus according to claim 1, wherein the first relative movement is a rotation about a first rotational axis A and said first direction corresponds to a rotation in the positive direction of rotation about the rotational axis A, and wherein the second relative movement is a rotation about a second rotational axis B and said second direction corresponds to a rotation in the positive direction of rotation about the rotational axis B.

3. The articulated apparatus according to one of the preceding claims, wherein the first and the second fixing device have in each case at least one magnetic element.

4. The articulated apparatus according to claim 1,
said articulated apparatus having a first holding device which is realized for the purpose of opposing the first relative movement with a resistance, at least one first breakaway force being necessary to overcome said resistance and
said articulated apparatus having a second holding device which is realized for the purpose of opposing the first relative movement with a resistance, at least one second breakaway force being necessary to overcome said resistance.

5. The articulated apparatus according to claim 4, wherein the first holding device has a first friction device which brings about a first sliding friction during the first relative movement and in non-moved relative positions of the first and second part brings about a first static friction, at least said first breakaway force being necessary to overcome said sliding and static friction and
the second holding device has a second friction device which brings about a second sliding friction during the second relative movement and in non-moved relative positions of the first and second part brings about a second static friction, at least said second breakaway force being necessary to overcome said sliding and static friction.

6. The articulated apparatus according to claim 4 or 5, wherein the first and the second release force are in each case greater than said first and/or second breakaway force.

7. The articulated apparatus according to claim 5, wherein the first friction device has an elastically deformable ring as an auxiliary element which is arranged concentrically with respect to a first rotational axis A and which is clamped between the first part and the second part for bringing about the first sliding friction and first static friction and
the second friction device has an elastically deformable ring as an auxiliary element which is arranged concentrically with respect to a second rotational axis B and which is clamped between the second part and the third part for bringing about the second sliding friction and second static friction.

8. The articulated apparatus according to claim 1, wherein the first and the third part have in each case a fastening device for fastening a further component, in particular by means of a groove/tongue joint.

9. The articulated apparatus according to claim 1, said articulated apparatus having a fourth part, wherein the third and the fourth part are connected together so as to be movable for carrying out a third relative movement, in particular by means of a third guide device, having a third stop device, by way of which the third relative movement is blocked in a third stop position in which the third and fourth part impact against one another in a third direction, and having a third fixing device by way of which the third and fourth part are held in the third stop position in opposition to a release force which is directed into a negative third direction until said release force exceeds a third fixing force and wherein a second combined stop position is settable as a second target position in which the second stop position and the third stop position are both present.

10. The articulated apparatus according to claim 1, wherein the first and second relative movement is a rotation which can be measured in degrees and wherein the precision q of the setting of the combined stop position where q is $<=(+-)5*10^-1$ degrees, where preferably $q<=(+-)10^-1$ degrees and where preferably $q<=(+-)5*10^-2$ degrees.

11. A micromanipulator arrangement having the articulated apparatus according to claim 1.

12. Method for utilizing the articulated apparatus according to claim 1, in particular in the case of a method for the micromanipulation of an artificial or biological object, in particular of a living cell or a micro organism, in particular using the micromanipulator arrangement, having at least one of the following steps:
(i) set the target position of said articulated apparatus as an operating position in which, in particular, a micromanipulation tool which is connected to the articulated apparatus, in particular a capillary tube or a micro dissection tool, is at the desired distance to the object;
(ii) proceeding from the first stop position, in particular proceeding from the target position: carry out a first relative movement, in particular a rotation in a rotational direction $-\omega$, between the first part and the second part of said articulated apparatus, until the first part and the second part are arranged in a first relative position;
(iii) proceeding from the second stop position, in particular proceeding from the target position: carry out a second relative movement, in particular a rotation into an opposing rotational direction $-\omega$, between the third part and the second part of said articulated apparatus until the third part and the second part are arranged in a second relative position;
(iv) proceeding from the first relative position described in step (ii) or from the second relative position described in step (iii): carry out manual treatment of the first part and/or the third part, in particular remove and/or release a micromanipulation tool which is connected to the first or third part (tool change);
(v) proceeding from the first relative position described in step (ii) or the second relative position described in step (iii): carry out a treatment on the object to be manipulated, in particular remove or add culture medium, buffer or a solution, remove the object and/or add a further object;
(vi) Proceeding from the first relative position described in step (ii) and/or from the second relative position described in step (f): reposition the articulated apparatus into the target position or operating position by pivoting it back manually out of the first and/or second relative position.

* * * * *